United States Patent
Dal Zotto

(10) Patent No.: US 11,832,187 B2
(45) Date of Patent: Nov. 28, 2023

(54) ELECTRONIC DEVICE WAKES

(71) Applicant: HEWLETT-PACKARD DEVELOPMENT COMPANY, L.P., Spring, TX (US)

(72) Inventor: Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 407 days.

(21) Appl. No.: 17/357,881

(22) Filed: Jun. 24, 2021

(65) Prior Publication Data
US 2022/0417860 A1    Dec. 29, 2022

(51) Int. Cl.
| | |
|---|---|
| H04W 52/02 | (2009.01) |
| G10L 25/51 | (2013.01) |
| G10L 25/21 | (2013.01) |
| G06T 7/50 | (2017.01) |
| G10L 25/18 | (2013.01) |
| G06V 40/10 | (2022.01) |
| G06V 40/16 | (2022.01) |
| H04N 23/60 | (2023.01) |

(52) U.S. Cl.
CPC .......... *H04W 52/0251* (2013.01); *G06T 7/50* (2017.01); *G06V 40/10* (2022.01); *G06V 40/172* (2022.01); *G10L 25/18* (2013.01); *G10L 25/21* (2013.01); *G10L 25/51* (2013.01); *H04N 23/60* (2023.01); *G06T 2207/30196* (2013.01)

(58) Field of Classification Search
CPC ..... H04W 52/0251; G06T 7/50; G06V 40/10; G10L 25/18
See application file for complete search history.

(56) References Cited

U.S. PATENT DOCUMENTS

| | | | |
|---|---|---|---|
| 10,708,706 B1 * | 7/2020 | Brimijoin, II | H04S 7/304 |
| 2022/0159195 A1 * | 5/2022 | Yang | H04N 7/142 |

OTHER PUBLICATIONS

Hewlett-Packard Development Company, L.P., "Meeting Video Substitutes," PCT Patent App No. PCT/US2021/022007, filed Mar. 11, 2021, 35 p.
Ruiz-Sarmiento et al., "Improving Human Face Detection Through TOF Cameras For Ambient Intelligence Applications," Copyright 2020 Springer Nature Switzerland AG, 5 p.

* cited by examiner

*Primary Examiner* — Gerald Johnson
(74) *Attorney, Agent, or Firm* — QUARLES & BRADY LLP

(57) ABSTRACT

In some examples, a non-transitory machine-readable medium stores machine-readable instructions. When executed by a controller of an electronic device, the machine-readable instructions cause the controller to detect a user presence, determine first and second measurements, where the first and the second measurements indicate first and second distances to the user presence, and, responsive to a determination that the second measurement is less than the first measurement and a determination that the second measurement is within a distance threshold, wake the electronic device from a power saving mode.

15 Claims, 5 Drawing Sheets

ELECTRONIC DEVICE WAKES

BACKGROUND

Electronic devices such as notebooks, laptops, desktops, tablets, smartphones, and printers may include multiple power saving modes to reduce power consumption when the electronic device is not in use. The multiple power saving modes reduce power consumption by disabling various subsystems of the electronic device.

BRIEF DESCRIPTION OF THE DRAWINGS

Various examples are described below referring to the following figures.

DETAILED DESCRIPTION

Figure 1:
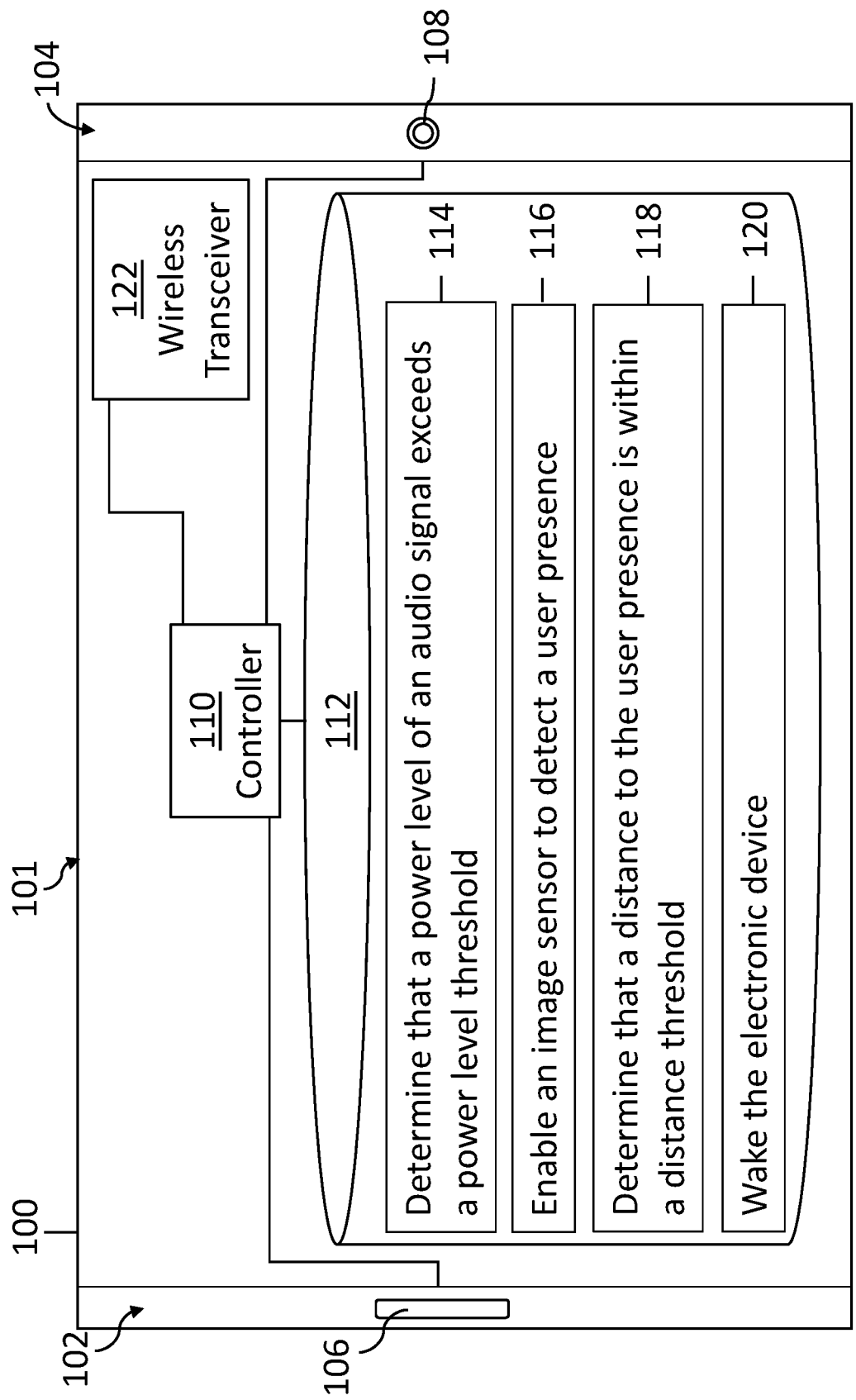
FIG. 1 is an electronic device having fast wake enabled, in accordance with various examples.

As described above, electronic devices such as notebooks, laptops, desktops, tablets, smartphones, and printers may include multiple power saving modes. The multiple power saving modes reduce power consumption by disabling various subsystems of the electronic device when the electronic device is not in use. However, the power saving modes also present disadvantages, such as increased wake times. For instance, in a first power saving mode (e.g., sleep), a clock signal of the processor of the electronic device is disabled but other clock signals of the electronic device are enabled. Disabling the clock signal enables the electronic device to quickly exit the first power saving mode (e.g., wake). In a second power saving mode (e.g., deep sleep, hibernate), multiple clock signals of the electronic device are disabled. Disabling the multiple clock signals lengthens a duration of the wake time as compared to the wake time associated with the first power saving mode. In a third power saving mode (e.g., powered down, powered off), the electronic device may be shut down. Shutting down the electronic device lengthens a duration of the wake time as compared to the wake time associated with other power saving modes. While power saving modes reduce power consumption, the time delays that result from waking the electronic devices from the power saving modes often result in user frustration and reduced user productivity.

To mitigate the wake time delays associated with power saving modes, this description describes an electronic device comprising an audio input device to detect an audio signal, an image sensor to detect a user presence, and a controller. The controller determines whether a power level of the audio signal exceeds a power level threshold, a frequency of the audio signal exceeds a frequency threshold, or a combination thereof. Based on the power level exceeding the power level threshold, the frequency exceeding the frequency threshold, or a combination thereof, the controller enables the image sensor to detect the user presence, if any. Based on the image sensor detecting the user presence, the controller determines a distance to the user presence. The controller determines whether the distance to the user presence is within a distance threshold. Based on the distance to the user presence being within the distance threshold, the controller wakes the electronic device from a power saving mode.

An electronic device utilizing the audio input device and the image sensor to detect an approach of a user and wake the electronic device in response to the detection provides for an improved user experience by decreasing a perceived wake time. The perceived wake time is the wake time the user experiences after arriving at the electronic device. Decreasing the perceived wake time may be referred to herein as a "fast wake." Utilizing the audio input device and the image sensor to detect the approaching user and fast wake the electronic device enables a handsfree user interaction that provides for an improved user experience. Utilizing the image sensor to detect the user may also increase security and battery life by preventing the electronic device from fast waking in response to random noises.

In an example in accordance with the present description, an electronic device is provided. The electronic device comprises an audio input device to detect an audio signal and a controller coupled to the audio input device. The controller is to, responsive to a determination that a power level of the audio signal exceeds a power level threshold, enable an image sensor to detect a user presence and, responsive to a determination that a distance to the user presence is within a distance threshold, wake the electronic device from a power saving mode.

In another example in accordance with the present description, an electronic device is provided. The electronic device comprises an audio input device to detect first and second audio signals and a controller coupled to the audio input device. The controller is to determine a first frequency of the first audio signal and a second frequency of the second audio signal and determine whether the second frequency exceeds the first frequency. Responsive to a determination that the second frequency exceeds the first frequency, the controller is to enable an image sensor to detect a user presence and, responsive to a detection of the user presence, wake the electronic device from a power saving mode.

In yet another example in accordance with the present description, a non-transitory machine-readable medium is provided. The non-transitory machine-readable medium includes all electronic mediums or media of storage, except signals. The non-transitory machine-readable medium stores machine-readable instructions. When executed by a controller of an electronic device, the machine-readable instructions cause the controller to detect a user presence, determine first and second measurements, where the first and the second measurements indicate first and second distances to the user presence, and, responsive to a determination that the second distance is less than the first distance and a determination that the second distance is within a distance threshold, wake the electronic device from a power saving mode.

Referring now to FIG. 1, an electronic device 100 having fast wake enabled is provided, in accordance with various examples. The electronic device 100 may be a notebook, a laptop, a desktop, a tablet, a smartphone, a printer, or any other device having multiple power saving modes to reduce power consumption when not in use. The electronic device 100 comprises a chassis 101 and bezels 102, 104. The chassis 101 may house internal hardware components of the electronic device 100. The internal hardware components include a controller 110, a storage device 112, and a wireless transceiver 122. The controller 110 may be a microprocessor, a microcomputer, a microcontroller, a programmable integrated circuit, a programmable gate array, or other suitable device for managing operations of the electronic device 100 when the electronic device 100 is in a power saving mode. In some examples, the controller 110 may be an end point security controller (EpSC), an electronic Artificial Intelligence (eAI) chip, or other suitable embedded controller (EC) having a storage device storing machine-readable instructions that enable secure system operations of the electronic device 100. The storage device 112 may be a hard drive, a solid-state drive (SSD), flash memory, random access memory (RAM), or other suitable memory device. In some examples, the storage device 112 may be internal to the controller 110. The wireless transceiver 122 is to transmit and receive wireless signals. The wireless transceiver 122 may transmit or receive a BLUETOOTH® (BT) or WI-FI® signal, for example. The bezels 102, 104 may secure a display panel of the electronic device 100. In some examples, the bezels 102, 104 are included in a body of the chassis 101. The bezel 102 may comprise an audio input device 106. The audio input device 106 may be a microphone or any suitable device for recording sound. The bezel 104 may comprise an image sensor 108. The image sensor 108 may be a camera, a time-of-flight sensor, or any suitable device for detecting images.

The controller 110 couples to the audio input device 106, the image sensor 108, the wireless transceiver 122, and the storage device 112. The storage device 112 may store machine-readable instructions that, when executed by the controller 110 may cause the controller 110 to perform some or all of the actions attributed herein to the controller 110. The machine-readable instructions may be the machine-readable instructions 114, 116, 118, 120.

In various examples, when executed by the controller 110, the machine-readable instructions 114, 116, 118, 120 cause the controller 110 to fast wake the electronic device 100. The machine-readable instruction 114 causes the controller 110 to determine that a power level of an audio signal exceeds a power level threshold. The audio input device 106 may detect the audio signal. The power level may be measured in decibels (dBs). The power level threshold may be stored on the storage device 112. The machine-readable instruction 116 causes the controller 110 to enable the image sensor 108 to detect a user presence. The image sensor 108 may detect the user presence utilizing a facial detection technique that differentiates human faces from other moving objects. For example, utilizing the facial detection, the controller 110 may compare a shape to a data structure (e.g., database) comprising shapes comprising features. The data structure may be stored on the storage device 112. The controller 110 may measure a feature of the shape to determine if the measurements are equivalent to measurements of a shape comprising features of the data structure. The machine-readable instruction 118 causes the controller 110 to determine that a distance to the user presence is within a distance threshold. For example, the controller 110 may determine the distance to the user presence by calculating a change in time from an emission of a signal by the image sensor 108 to a return of the signal. The signal may be comprised of photons, for example. In another example, the controller 110 may determine the distance to the user presence by calculating a change in size of the user relative to fixed images of a background. In yet another example, the controller 110 may determine the distance to the user presence by utilizing a proportional relationship between facial features and a characteristic such as focal length of the image sensor 108. The distance threshold may be measured in inches, centimeters, feet, or meters, for example. The distance threshold may be stored on the storage device 112. The machine-readable instruction 120 causes the controller 110 to wake the electronic device 100 from a power saving mode. As described above, the power saving mode may include a sleep mode, a hibernate mode, or a shutdown mode. The controller 110 may wake the electronic device 100 from the power saving mode by activating a system power management handler of the electronic device 100. In various examples, the controller 110 may determine a second distance to the user presence is outside the distance threshold and return the electronic device 100 to the power saving mode.

In some examples, the power level of the audio signal is below the power level threshold. The audio input device 106 may detect a second audio signal. The controller 110 may determine that a power level of the second audio signal exceeds the power level threshold and enable the image sensor 108 to detect the user presence. The controller 110 may determine that a distance to the user presence is within a distance threshold and wake the electronic device 100 from a power saving mode. In other examples, the distance to the user presence is outside the threshold distance. The controller 110 may determine a second distance to the user presence is within the distance threshold and wake the electronic device 100 from the power saving mode.

In various examples, the controller 110 may determine a power level of a second audio signal is below the power level threshold. The controller 110 may determine a second distance to the user presence. The controller 110 may determine the second distance is outside the threshold distance and return the electronic device 100 to the power saving mode.

As described above, in some examples, the controller 110 may determine that a frequency of the audio signal exceeds a frequency threshold. The frequency may be measure in hertz (Hz). The frequency threshold may be stored on the storage device 112. Based on the frequency exceeding the frequency threshold, the controller 110 may enable the image sensor 108 to detect the user presence, if any. In other examples, the controller 110 may determine that a power level and a frequency of the audio signal exceed a power level threshold and a frequency threshold, respectively. Based on the power level exceeding the power level threshold and the frequency exceeding the frequency threshold, the controller 110 may enable the image sensor 108 to detect the user presence, if any.

In some examples, a manufacturer of the electronic device 100 may determine the power level threshold, the frequency threshold, the distance threshold, or a combination thereof at a time of manufacturing. In various examples, a user of the electronic device 100 may determine or modify the power level threshold, the frequency threshold, the distance threshold, or a combination thereof utilizing a graphical user interface (GUI) of the electronic device 100. In other examples, a machine learning technique may utilize data from previous wake occurrences of the electronic device 100 to determine or modify the power level threshold, the frequency threshold, the distance threshold, or a combination thereof. The machine learning technique may be a supervised learning technique such as logistic regression, k-Nearest Neighbor (kNN), or decision tree, an unsupervised learning technique such as K-means, a reinforced learning technique such as Markov decision process, or a combination thereof. Utilizing the machine learning technique, the controller 110 determines relationships between variables such as the power level threshold, the frequency threshold, the distance threshold, a power level measurement, a frequency measurement, a respective distance to the measurement, an occurrence of a wake, an occurrence of a user utilizing the electronic device 100, or a combination thereof. Based on the relationships, the controller 110 may more accurately predict an instance when the user is approaching to interact with the electronic device 100 and wake the electronic device 100 from the power saving mode.

For example, the machine learning technique may analyze first and second power level or frequency measurements and a respective distance to the user presence for previous wakes (e.g., fast wakes and wakes in which the user pressed a button of the electronic device 100 to wake) and determine that the user's noise level when approaching the electronic device 100 in a power saving mode is low. Responsive to the determination, the controller 110 may decrease the power level threshold, decrease the frequency threshold, increase the distance threshold, or a combination thereof to increase a number of occurrences of fast wakes.

In another example, the machine learning technique may analyze first and second power level or frequency measurements and a respective distance to the user presence for previous fast wakes and determine that the user's noise level in a power saving mode is high and that a number of previous fast wakes are associated with a subsequent lack of user interaction (e.g., the user did not utilize the electronic device 100 within a period of time so as to prevent the electronic device 100 from returning to a power saving mode). Responsive to the determination, the controller 110 may increase the power level threshold, increase the frequency threshold, decrease the distance threshold, or a combination thereof to prevent future fast wakes having a subsequent lack of user interaction with the electronic device 100.

Enabling the user of the electronic device 100 or a machine learning technique to determine or modify the power level threshold, the frequency threshold, the distance threshold, or a combination thereof provides for an improved user experience by decreasing the perceived wake time and may also increase security and battery life by preventing the electronic device 100 from waking in response to random noises.

Figure 2:
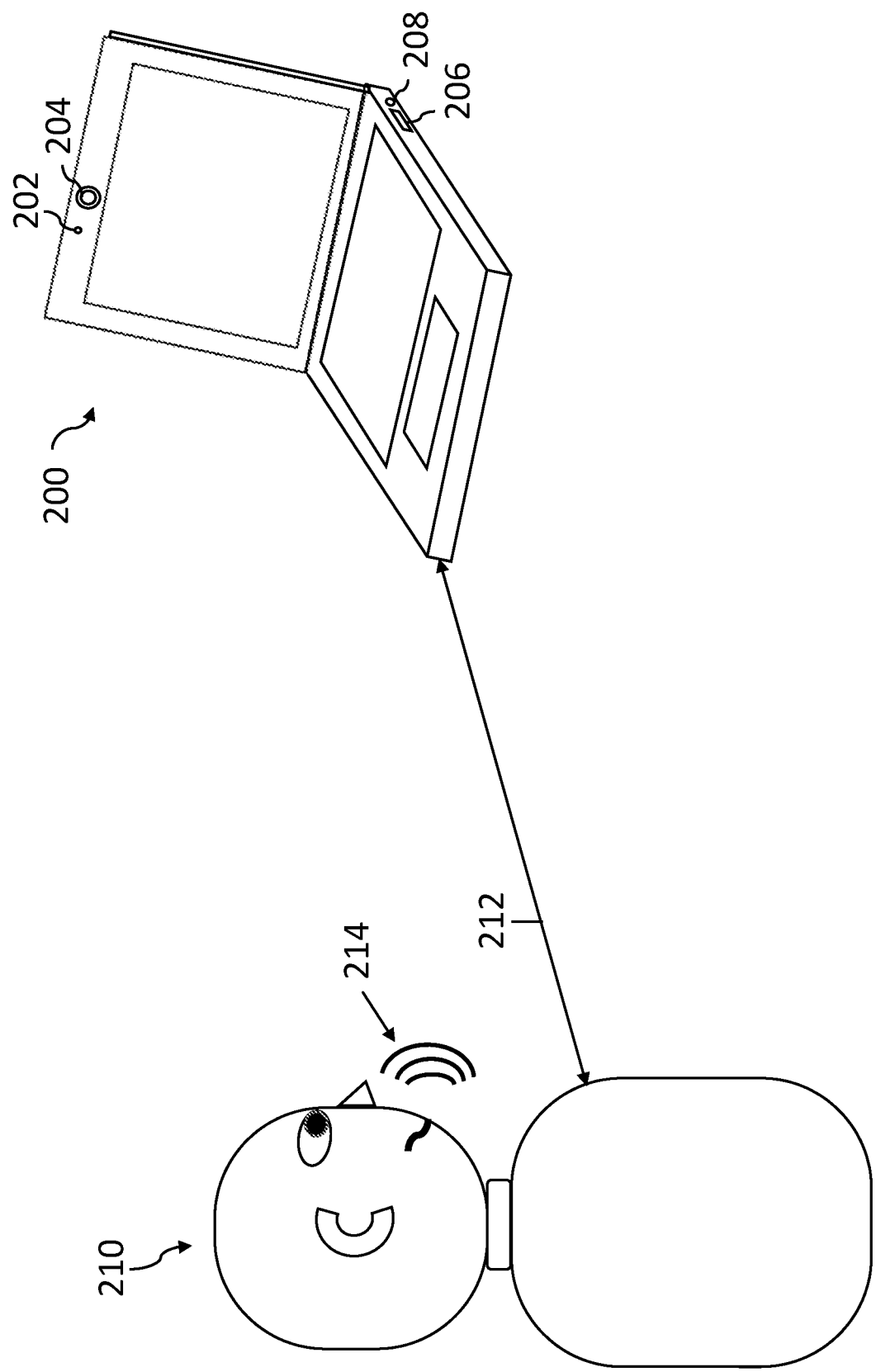
FIG. 2 is an electronic device having fast wake enabled, in accordance with various examples.

Referring now to FIG. 2, an electronic device 200 having fast wake enabled is provided, in accordance with various examples. The electronic device 200 may be the electronic device 100. The electronic device 200 comprises an audio input device 202, an image sensor 204, and connectors 206, 208. The audio input device 202 may be the audio input device 106. The image sensor 204 may be the image sensor 108. The connectors 206, 208 may be connectors to enable a wired connection to an external audio input device, an external image sensor, or a combination thereof. The wired connection may be a universal serial bus (USB) connection, an audio jack connection, or a combination thereof.

A user 210 is in a proximity of the electronic device 200. The user 210 may emit a sound 214. In some examples, the sound 214 may be a sound of an environment of the user 210. For example, the sound 214 may be a sound of a door opening, a dog barking, a footstep, a voice, or a combination thereof. In various examples, the audio input device 202 may detect an audio signal comprising the sound 214. In other examples, an audio input device coupled to the connector 206, 208 may detect the audio signal comprising the sound 214. A controller (e.g., the controller 110) of the electronic device 200 may determine that a power level of the audio signal exceeds a power level threshold, a frequency of the audio signal exceeds a frequency threshold, or a combination thereof and enable the image sensor 204. In various examples, the controller may enable an image sensor coupled to the connector 206, 208. The image sensor 204 may determine a distance 212 to the user 210. Responsive to a determination that the distance 212 to the user 210 is within a distance threshold, the controller may wake the electronic device 200.

Figure 3:
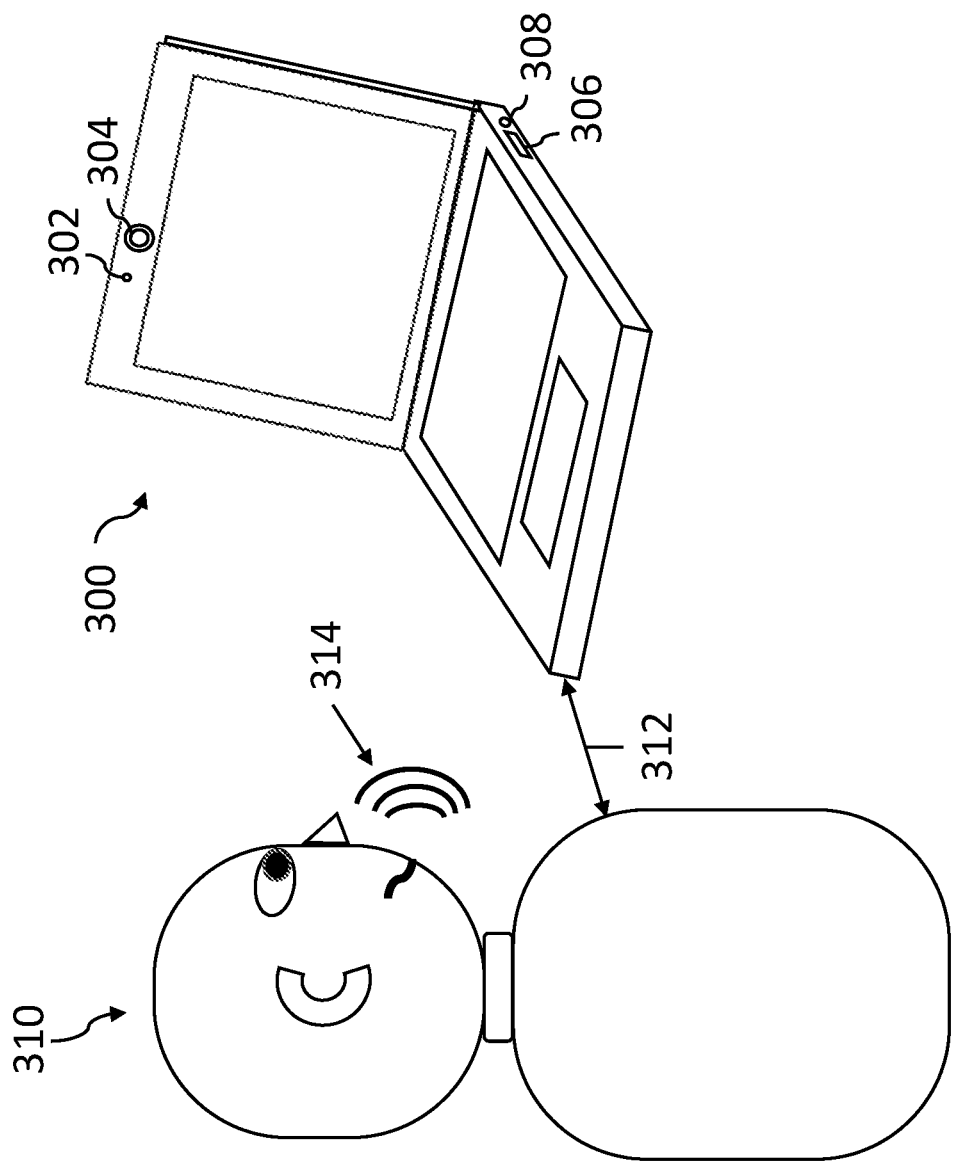
FIG. 3 is an electronic device having fast wake enabled, in accordance with various examples.

Referring now FIG. 3, an electronic device 300 having fast wake enabled is provided, in accordance with various examples. The electronic device 300 may be the electronic device 100, 200. The electronic device 300 comprises an audio input device 302, an image sensor 304, and connectors 306, 308. The audio input device 302 may be the audio input device 106, 202. The image sensor 304 may be the image sensor 108, 204. The connectors 306, 308 may be the connectors 206, 208.

A user 310 is in a proximity of the electronic device 300. The user 310 may emit a sound 314. In some examples, the sound 314 may be a sound of an environment of the user 310. For example, the sound 314 may be a sound of a door opening, a dog barking, a footstep, a voice, or a combination thereof. In some examples, the user 310 is the user 210 and the sound 314 is a second sound in the environment of the user 310. As described below with respect to FIG. 4, the audio input device 302 or an audio input device coupled to the connector 306, 308 (e.g., the connector 206, 208, respectively) may detect a first audio signal comprising the sound 214 and a second audio signal comprising the sound 314. A controller (e.g., the controller 110) of the electronic device 300 (e.g., the electronic device 200) may determine whether a measurement of the second audio signal exceeds a measurement of the first audio signal. The measurement may be a power level or a frequency. Responsive to a determination that the measurement of the second audio signal exceeds the measurement of the first audio signal, the controller may enable the image sensor 304 (e.g., the image sensor 204) or an image sensor coupled to the connector 306, 308 (e.g., the connector 206, 208, respectively). The image sensor 304 may determine a distance 312 to the user 310. Responsive to a determination that the distance 312 to the user 310 is within a distance threshold, the controller may wake the electronic device 300.

As described below with respect to FIG. 5, the audio input device 302 (e.g., the audio input device 202) or an audio input device coupled to the connector 306, 308 (e.g., the connector 206, 208, respectively) may detect a presence. The presence may be indicated by the sound 214. The controller may determine a first measurement of a first audio signal comprising the sound 214 and a second measurement of a second audio signal comprising the sound 314. The measurement may be a power level or a frequency. The controller may determine a first distance 212 based on the first measurement and a second distance 312 based on the second measurement. The controller may determine the second distance 312 is less than the first distance 212. Responsive to a determination that the distance 312 is within a distance threshold, the controller may wake the electronic device 300.

The electronic device 100, 200, 300 utilizing the audio input device 106, 202, 302, an audio input device coupled to the connector 206, 208, 306, 308 or an audio input device coupled to the wireless transceiver 122 and the image sensor 108, 204, 304, an image sensor coupled to the connector 206, 208, 306, 308 or an image sensor coupled to the wireless transceiver 122 to detect an approach of the user 210, 310 and wake in response to the detection provides for an improved user experience by decreasing the perceived wake time. Utilizing the image sensor 108, 204, 304, an image sensor coupled to the connector 206, 208, 306, 308 or an image sensor coupled to the wireless transceiver 122 to detect the user 210, 310 may also increase security and battery life by preventing the electronic device 100, 200, 300 from waking in response to random noises.

Figure 4:
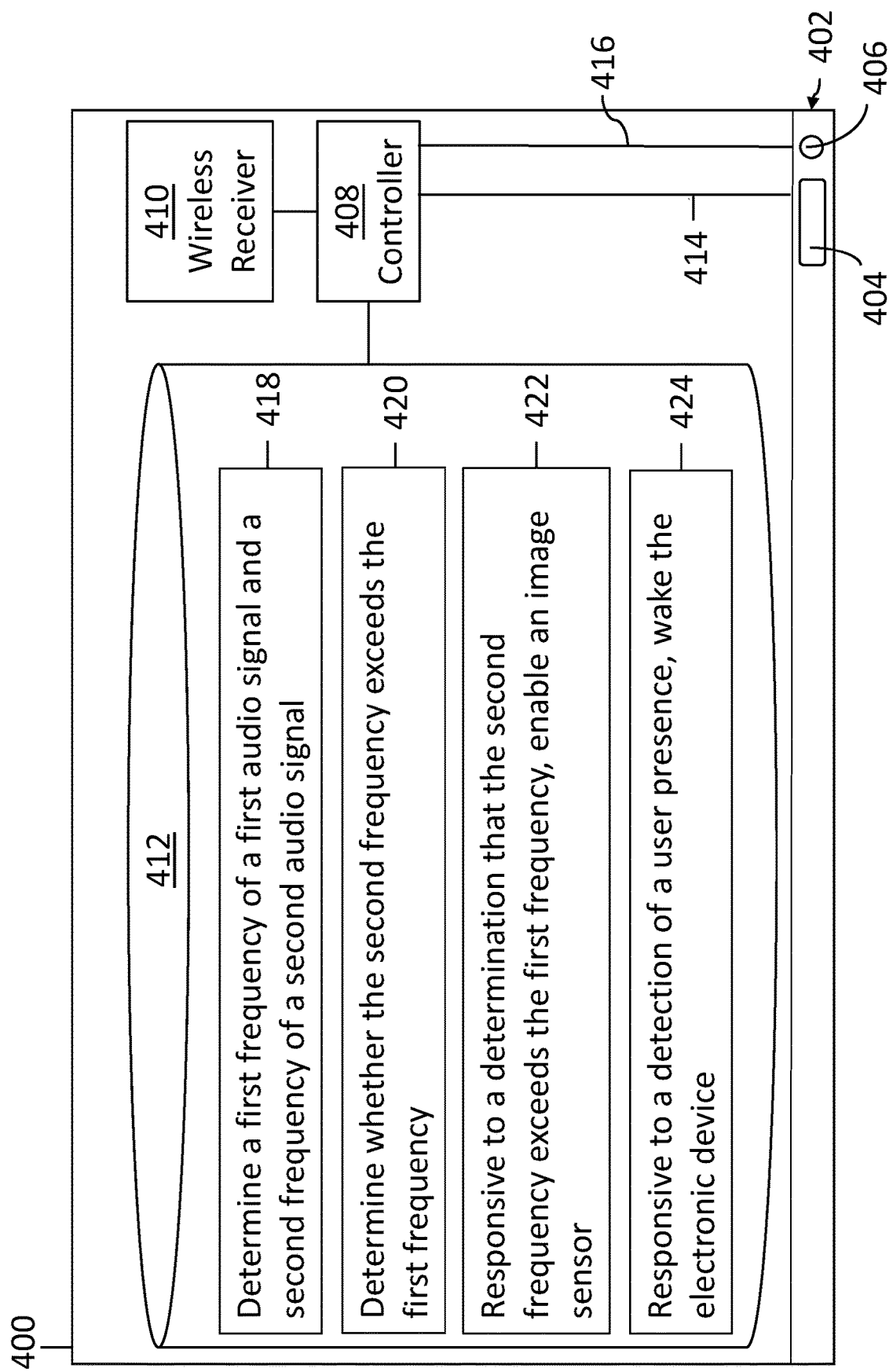
FIG. 4 is an electronic device having fast wake enabled, in accordance with various examples.

Referring now to FIG. 4, an electronic device 400 having fast wake enabled is provided, in accordance with various examples. The electronic device 400 may be the electronic device 100, 200, 300. The electronic device 400 comprises a chassis 402. The chassis 402 may be the chassis 101. The chassis 402 may house connectors 404, 406, a controller 408, a wireless transceiver 410, a storage device 412, and communication buses 414, 416. The connectors 404, 406 may be the connectors 206, 208, 306, 308. The controller 408 may be the controller 110. The wireless transceiver 410 may be the wireless transceiver 122. The storage device 412 may be the storage device 112.

The controller 408 couples to the connectors 404, 406 via the communication buses 414, 416, the wireless transceiver 410, and the storage device 412. The storage device 412 may store machine-readable instructions that, when executed by the controller 408 may cause the controller 408 to perform some or all of the actions attributed herein to the controller 408. The machine-readable instructions may be the machine-readable instructions 418, 420, 422, 424.

In various examples, when executed by the controller 408, the machine-readable instructions 418, 420, 422, 424 cause the controller 408 to fast wake the electronic device 400. The machine-readable instruction 418 causes the controller 408 to determine a first frequency of the first audio signal (e.g., the audio signal comprising the sound 214) and a second frequency of the second audio signal (e.g., the audio signal comprising the sound 314). An audio input device coupled to the connector 404, 406 or coupled to the wireless transceiver 410 may detect the first and the second audio signals. The machine-readable instruction 420 causes the controller 408 to determine whether the second frequency exceeds the first frequency. Responsive to a determination that the second frequency exceeds the first frequency, the machine-readable instruction 422 causes the controller 408 to enable an image sensor coupled to the connector 404, 406 or an image sensor coupled to the wireless transceiver 410 to detect a user presence. The user may be the user 210, 310, for example. Responsive to a detection of the user presence, the machine-readable instruction 424 causes the controller 408 to wake the electronic device 400 from a power saving mode.

In various examples, in response to a determination that the second frequency is below the first frequency, the controller 408 may determine a first power level of the first audio signal and a second power level of the second audio signal. The controller 408 may enable the image sensor coupled to the connector 404, 406 or the image sensor coupled to the wireless transceiver 410 to detect the user presence in response to a determination that the second power level exceeds the first power level. The controller 408 may wake the electronic device 400 from the power saving mode in response to the detection of the user presence.

In some examples, responsive to the detection of the user presence, the controller 408 may perform a facial recognition technique to verify an identity of the user. For example, the facial recognition technique may utilize an identification (ID) verification service (e.g., a system that prevents unauthorized access by comparing a user's face to stored facial patterns that may comprise multiple clothing items, facial hair styles, or makeup styles). In response to a failed verification of the identity of the user, the controller 408 may return the electronic device 400 to the power saving mode.

In other examples, the audio input device coupled to the connector 404, 406 or coupled to the wireless transceiver 410 detects a third audio signal. The controller 408 may determine a third frequency of the third audio signal. The controller 408 may determine whether the third frequency exceeds the second frequency. In response to a determination that the third frequency is below the second frequency, the controller 408 may return the electronic device 400 to the power saving mode.

The electronic device 400 utilizing an audio input device coupled to the connector 404, 406 or an audio input device coupled to the wireless transceiver 410 and an image sensor coupled to the connector 404, 406 or an image sensor coupled to the wireless transceiver 410 to detect an approach of the user (e.g., the user 210, 310) and wake in response to the detection provides for an improved experience of the user by decreasing the perceived wake time. Utilizing the image sensor coupled to the connector 404, 406 or the image sensor coupled to the wireless transceiver 410 to detect the user may also increase security and battery life by preventing the electronic device 400 from waking in response to random noises. Utilizing the image sensor coupled to the connector 404, 406 or the image sensor coupled to the wireless transceiver 410 to verify the user identity may also increase security by preventing unauthorized access to the electronic device 400.

Figure 5:
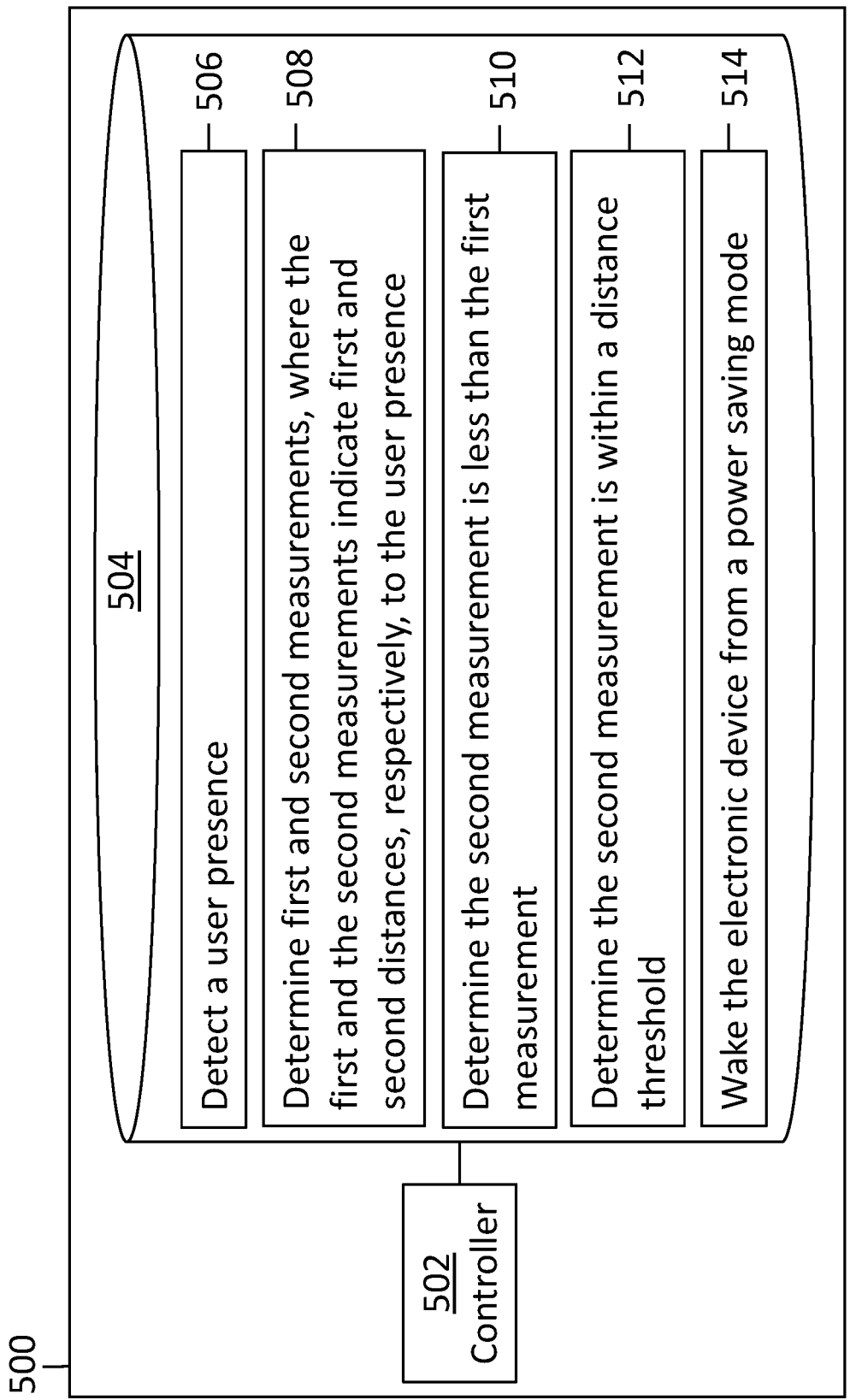
FIG. 5 is an electronic device having fast wake enabled, in accordance with various examples.

Referring now to FIG. 5, an electronic device 500 having fast wake enabled is provided, in accordance with various examples. The electronic device 500 may be the electronic device 100, 200, 300, 400. The electronic device 500 comprises the controller 502 and the non-transitory machine-readable medium 504. The non-transitory machine-readable medium 504 may be the storage device 112, 412. As described above, the term "non-transitory" does not encompass transitory propagating signals.

In various examples, the electronic device 500 comprises the controller 502 coupled to the non-transitory machine-readable medium 504. The non-transitory machine-readable medium 504 may store machine-readable instructions. The machine-readable instructions may be the machine-readable instructions 506, 508, 510, 512, 514. The machine-readable instructions 506, 508, 510, 512, 514, when executed by the controller 502, may cause the controller 502 to perform some or all of the actions attributed herein to the controller 502.

In various examples, when executed by the controller 502, the machine-readable instructions 506, 508, 510, 512, 514 cause the controller 502 to fast wake the electronic device 500. The machine-readable instruction 506 causes the controller 502 to detect a user presence. The user may be the user 210, 310. The machine-readable instruction 508 causes the controller 502 to determine first and second measurements, where the first and the second measurements indicate first and second distances (e.g., the distances 212, 312, respectively) to the user presence. The machine-readable instruction 510 causes the controller 502 to determine that the second distance is less than the first distance. The machine-readable instruction 512 causes the controller 502 to determine that the second distance is within a distance threshold. The machine-readable instruction 514 causes the controller 502 to wake the electronic device 500 from a power saving mode.

As described above with respect to FIGS. 1-4, in some examples, the controller 502 may detect the presence by analyzing a measurement of the audio signal. The controller 502 may determine the first and the second measurements are first and second frequencies, respectively, of the audio signal. The first frequency is for a first duration of the audio signal and the second frequency is for a second duration of the audio signal. The second duration is sequential in time to the first duration. In other examples, the controller 502 may detect the presence by analyzing sounds of the audio signal. The audio signal may include a sound of a door opening, a footstep, a barking dog, speech, or a combination thereof, for example. The controller 502 may determine the presence is a user (e.g., the user 210, 310) by utilizing a speech recognition technique to determine whether the audio signal comprises speech. Responsive to a determination that the audio signal comprises speech, the controller 502 may enable an image sensor (the image sensor 108, 204, 304, an image sensor coupled to the connector 206, 208, 404, 406, or an image sensor coupled to the wireless transceiver 122, 410) to detect the user presence.

In other examples, the controller 502 may utilizing a machine learning technique to determine a pattern of user behavior that precedes a fast wake. For example, the controller 502 may detect the sound of the barking dog, the sound of the door opening, and an increase in frequency or power level of the sound of the barking dog preceding an increase in frequency or power level of speech, footsteps, or a combination thereof. The controller 502 may determine the pattern precedes a fast wake. Responsive to a determination that an audio signal comprises the pattern or a portion of the pattern, the controller 502 may wake the electronic device 500.

The controller 502 may analyze an image detected by the image sensor (the image sensor 108, 204, 304, an image sensor coupled to the connector 206, 208, 404, 406, or an image sensor coupled to the wireless transceiver 122, 410) to detect the user presence utilizing the techniques discussed above with respect to FIG. 1. For example, the controller 502 may detect the user presence utilizing a facial detection technique that differentiates human faces from other moving objects. The controller 502 may determine a first and a second measurement of a first and a second image, respectively, to determine a first and a second distance, respectively, to the user presence. For example, the controller 502 may determine the first and the second measurements by calculating a change in time from an emission of a signal by the image sensor to a return of the signal. In another example, the controller 502 may determine the first and the second distances by calculating a change in size of the user relative to fixed images of a background in the first and the second images, respectively. The controller 502 may determine that the second distance is less than the first distance. The controller 502 may determine that the second distance is within the distance threshold. The controller 502 may wake the electronic device 500 from a power saving mode.

The electronic device 500 utilizing an audio input device (e.g., the audio input device 106, 202, 302, an audio input device coupled to the connector 206, 208, 404, 406, or an audio input device coupled to the wireless transceiver 122, 410) and an image sensor (e.g., the image sensor 108, 204, 304, an image sensor coupled to the connector 206, 208, 404, 406, or an image sensor coupled to the wireless transceiver 122, 410) to detect an approach of a user (e.g., the user 210, 310) and wake in response to the detection provides for an improved experience of the user by decreasing the perceived wake time. Utilizing a speech recognition technique to detect the presence is the user presence may also increase security and battery life by preventing the electronic device 500 from waking in response to random noises.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
   an audio input device to detect an audio signal; and
   a controller coupled to the audio input device, the controller to:
   responsive to a determination that a power level of the audio signal exceeds a power level threshold, enable an image sensor to detect a user presence; and
   responsive to a determination that a distance to the user presence is within a distance threshold, wake the electronic device from a power saving mode.

2. The electronic device of claim 1, wherein the power level of the audio signal is below the power level threshold; wherein the audio input device is to detect a second audio signal; and wherein the controller is to:
   responsive to a determination that a second power level of the second audio signal exceeds the power level threshold, enable the image sensor to detect the user presence; and
   responsive to a determination that a second distance to the user presence is within the distance threshold, wake the electronic device from the power saving mode.

3. The electronic device of claim 1, wherein the distance to the user presence is outside the distance threshold, and wherein the controller is to, responsive to a determination that a second distance to the user presence is within the distance threshold, wake the electronic device from the power saving mode.

4. The electronic device of claim 1, wherein the controller is to:
   responsive to a determination that a second power level of a second audio signal detected by the audio input device is below the power level threshold, determine a second distance to the user presence; and
   responsive to the second distance being outside the distance threshold, return the electronic device to the power saving mode.

5. The electronic device of claim 1, wherein the controller is to:
   determine a second distance to the user presence; and
   return the electronic device to the power saving mode in response to the second distance indicating the user is outside the distance threshold.

6. An electronic device, comprising:
an audio input device to detect first and second audio signals; and
a controller coupled to the audio input device, the controller to:
determine a first frequency of the first audio signal and a second frequency of the second audio signal;
determine whether the second frequency exceeds the first frequency;
responsive to a determination that the second frequency exceeds the first frequency, enable an image sensor to detect a user presence; and
responsive to a detection of the user presence, wake the electronic device from a power saving mode.

7. The electronic device of claim 6, wherein the controller is to:
responsive to the detection of the user presence, perform a facial recognition technique to verify an identity of the user presence; and
responsive to a failed verification of the identity of the user presence, return the electronic device to the power saving mode.

8. The electronic device of claim 6, wherein the audio input device is to detect a third audio signal, and wherein the controller is to:
determine a third frequency of the third audio signal;
determine whether the third frequency exceeds the second frequency; and
responsive to a determination that the third frequency is below the second frequency, return the electronic device to the power saving mode.

9. The electronic device of claim 6, wherein the controller is to:
responsive to a determination that the second frequency is below the first frequency, determine a first power level of the first audio signal and a second power level of the second audio signal;
responsive to a determination that the second power level exceeds the first power level, enable the image sensor to detect the user presence; and
responsive to the detection of the user presence, wake the electronic device from the power saving mode.

10. The electronic device of claim 6, wherein the image sensor is a camera or a time of flight sensor.

11. A non-transitory machine-readable medium storing machine-readable instructions which, when executed by a controller of an electronic device, cause the controller to:
detect a user presence;
determine first and second measurements, wherein the first and the second measurements indicate first and second distances, respectively, to the user presence; and
responsive to a determination that the second distance is less than the first distance and a determination that the second distance is within a distance threshold, wake the electronic device from a power saving mode.

12. The non-transitory machine-readable medium of claim 11, wherein the machine-readable instructions, when executed by the controller, cause the controller to analyze an audio signal to detect the user presence.

13. The non-transitory machine-readable medium of claim 12, wherein the machine-readable instructions, when executed by the controller, cause the controller to analyze the audio signal utilizing a speech recognition technique.

14. The non-transitory machine-readable medium of claim 12, wherein the first and the second measurements are first and second frequencies, respectively, the first frequency for a first duration of the audio signal and the second frequency for a second duration of the audio signal, wherein the second duration is sequential in time to the first duration.

15. The non-transitory machine-readable medium of claim 11, wherein the machine-readable instructions, when executed by the controller, cause the controller to analyze an image to detect the user presence.

* * * * *